US012677135B2

(12) United States Patent
Laddu et al.

(10) Patent No.: US 12,677,135 B2
(45) Date of Patent: Jul. 7, 2026

(54) RADIO PARAMETER DETECTION

(71) Applicant: Nokia Technologies Oy, Espoo (FI)

(72) Inventors: Keeth Saliya Jayasinghe Laddu, Espoo (FI); Dani Johannes Korpi, Espoo (FI); Mihai Enescu, Espoo (FI); Amaanat Ali, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 314 days.

(21) Appl. No.: 18/495,360

(22) Filed: Oct. 26, 2023

(65) Prior Publication Data

US 2024/0155329 A1 May 9, 2024

(30) Foreign Application Priority Data

Nov. 3, 2022 (FI) ..................................... 20225983

(51) Int. Cl.
*H04W 8/22* (2009.01)
*H04W 24/02* (2009.01)

(52) U.S. Cl.
CPC ............. *H04W 8/22* (2013.01); *H04W 24/02* (2013.01)

(58) Field of Classification Search
CPC ....... H04W 8/22; H04W 24/02; H04W 72/21; H04W 72/51; G06N 3/0464; G06N 3/0499; G06N 3/09; G06N 20/00
See application file for complete search history.

(56) References Cited

U.S. PATENT DOCUMENTS

| | | |
|---|---|---|
| 2020/0008188 A1 | 1/2020 | Nam et al. |
| 2020/0366537 A1 | 11/2020 | Wang et al. |
| 2021/0051585 A1 | 2/2021 | Kim et al. |
| 2021/0345132 A1* | 11/2021 | Jagannath ............. H04W 24/02 |
| 2021/0367738 A1* | 11/2021 | Taherzadeh Boroujeni ............... H04L 1/1896 |
| 2021/0376951 A1 | 12/2021 | Singh et al. |
| 2021/0385838 A1 | 12/2021 | Khoshnevisan et al. |

(Continued)

FOREIGN PATENT DOCUMENTS

| | | |
|---|---|---|
| EP | 3897033 A1 | 10/2021 |
| WO | 2021/181002 A1 | 9/2021 |

(Continued)

OTHER PUBLICATIONS

Kingma et al., "Adam: A Method for Stochastic Optimization", arXiv, Jan. 30, 2017, pp. 1-15.

(Continued)

*Primary Examiner* — Sujoy K Kundu
*Assistant Examiner* — Raul Rivas
(74) *Attorney, Agent, or Firm* — Carter, DeLuca & Farrell LLP

(57) ABSTRACT

Disclosed is a method comprising transmitting, to an access node, a report indicating capability, of an apparatus, regarding detecting radio parameters, wherein the report comprises at least one of a first set of radio parameters, a second set of radio parameters and a third set of radio parameters, receiving, from the access node, for determining the second set of radio parameters, at least one of the following: assistance information, a first configuration or an indication for determining the second set of parameters for receiving a downlink channel transmission, and receiving, from the access node, the downlink channel transmission.

1 Claim, 5 Drawing Sheets

(56)                References Cited

U.S. PATENT DOCUMENTS

| | | | |
|---|---|---|---|
| 2022/0046723 A1* | 2/2022 | Zhang ................. | H04W 72/044 |
| 2022/0191079 A1* | 6/2022 | Hoydis .................. | H04L 1/206 |
| 2022/0216938 A1 | 7/2022 | Pezeshki et al. | |
| 2022/0294666 A1 | 9/2022 | Jeon et al. | |
| 2022/0330012 A1 | 10/2022 | Bai et al. | |
| 2023/0079744 A1* | 3/2023 | Cavatassi ............. | H04L 1/0014 |
| | | | 706/21 |

FOREIGN PATENT DOCUMENTS

| | | | |
|---|---|---|---|
| WO | 2022/000188 A1 | 1/2022 | |
| WO | 2022/013104 A1 | 1/2022 | |
| WO | 2022/133866 A1 | 6/2022 | |
| WO | 2022/205023 A1 | 10/2022 | |

OTHER PUBLICATIONS

Balieiro et al., "A Machine Learning Approach for CQI Feedback Delay in 5G and Beyond 5G Networks", 30th Wireless and Optical Communications Conference (WOCC), Oct. 7-8, 2021, pp. 26-30.
IEEE 802.11, Wikipedia, Retrieved on Nov. 4, 2023, Webpage available at : https://en.wikipedia.org/wiki/IEEE_802.11.
IEEE 802.15, Wikipedia, Retrieved on Nov. 8, 2023, Webpage available at : https://en.wikipedia.org/wiki/IEEE_802.15.
Office action received for corresponding Finnish Patent Application No. 20225983, dated Mar. 23, 2023, 15 pages.
Extended European Search Report received for corresponding European Patent Application No. 23203941.2, dated Apr. 4, 2024, 9 pages.

* cited by examiner

Figure 5:
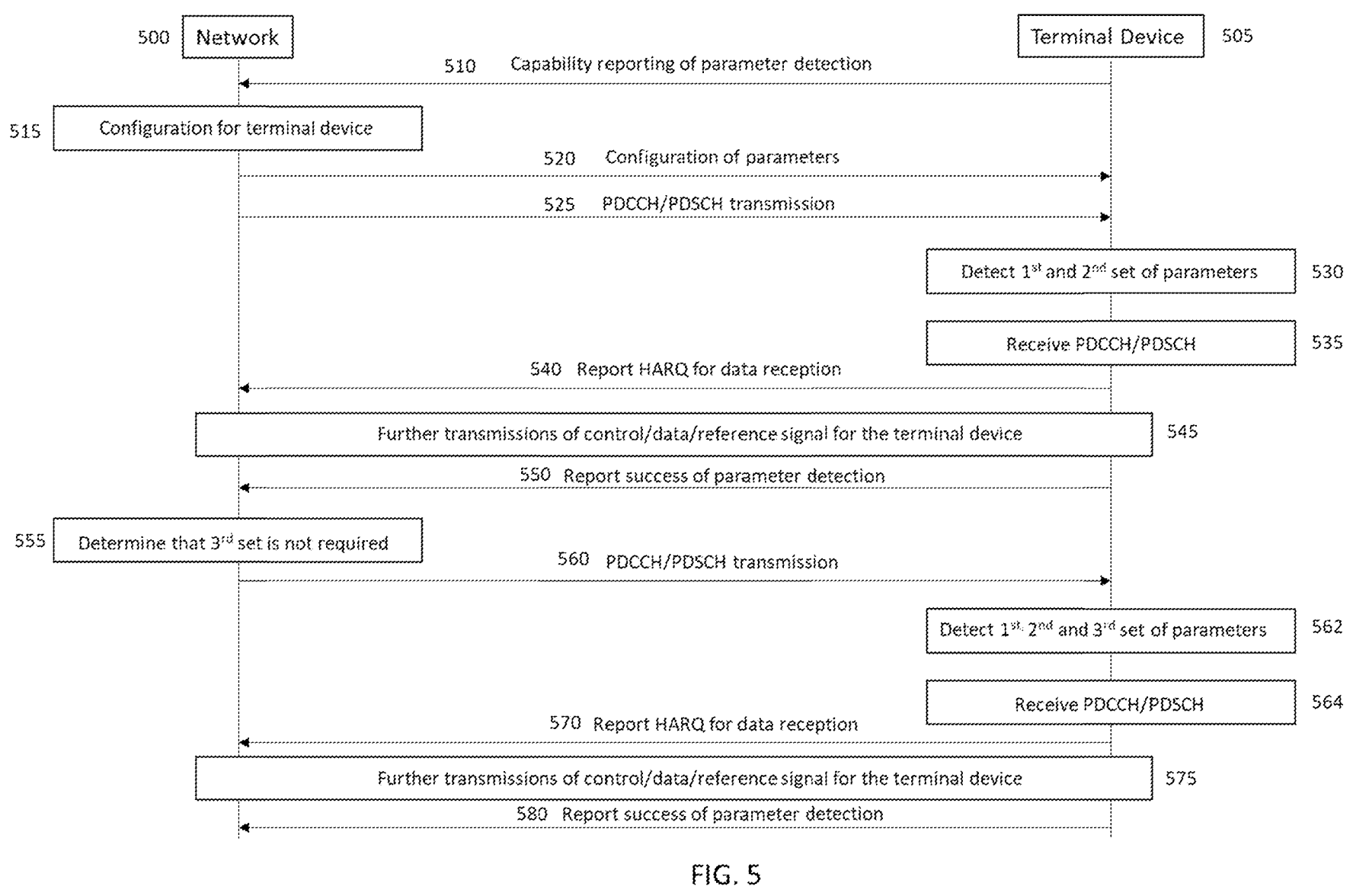

505   Terminal Device

500   Network

510   Capability reporting of parameter detection

515   Configuration for terminal device

520   Configuration of parameters

525   PDCCH/PDSCH transmission

530   Detect 1st and 2nd set of parameters

535   Receive PDCCH/PDSCH

540   Report HARQ for data reception

545   Further transmissions of control/data/reference signal for the terminal device 550   Report success of parameter detection 555   Determine that 3rd set is not required 560   PDCCH/PDSCH transmission 562   Detect 1st, 2nd and 3rd set of parameters 564   Receive PDCCH/PDSCH 570   Report HARQ for data reception 575   Further transmissions of control/data/reference signal for the terminal device 580   Report success of parameter detection

620    Memory                Input  630

610    Processor             Output  640

650    Connectivity

700

| 730 Communication Interface TX/RX | 710 Communication Control |
| --- | --- |

710
Communication Control

720
Memory

722
Computer Program Code

730
Communication Interface
TX/RX

740
Scheduler

RADIO PARAMETER DETECTION

RELATED APPLICATION

This application claims priority from FI Application No. 20225983, filed on Nov. 3, 2022, and entitled "RADIO PARAMETER DETECTION" which is incorporated herein by reference in its entirety.

FIELD

The following exemplary embodiments relate to wireless communication and detecting parameters associated with transmissions of data using the wireless communication.

BACKGROUND

Wireless communication networks, such as cellular communication networks offer a wide variety of options regarding how to configure terminal device for communication in the wireless network. While this brings flexibility, it also causes size of the configuration messages and also the size of terminal device capabilities to increase. Such increases may cause overhead in terms of signaling and it would thus be beneficial to address such increase of overhead.

BRIEF DESCRIPTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising means for transmitting, to an access node, a report indicating capability regarding detecting radio parameters, wherein the report comprises at least one of the following: a first set of radio parameters, a second set of radio parameters and a third set of radio parameters, and wherein the apparatus is capable to determine first set of radio parameters in a complete manner, determine the second set of radio parameters in the complete manner when at least one of the following assistance information, a first configuration or an indication related to the radio parameters is available, and determine the third set of radio parameters in the complete manner when a second configuration related to detecting the radio parameters is available at least during an initial configuration for receiving the downlink channel transmission or for a pre-determined time period, and the third set of radio parameters follow, at least substantially, the behavior of the first and the second set of radio parameters, receiving, from the access node, for determining the second set of radio parameters, at least one of the following: the assistance information, the first configuration or the indication for determining the second set of parameters for receiving a downlink channel transmission, and receiving, from the access node, the downlink channel transmission.

In some example embodiments according to the first aspect, the means comprises at least one processor, and at least one memory storing instructions that, when executed by the at least one processor, to cause the performance of the apparatus.

According to a second aspect there is provided an apparatus comprising at least one processor, and at least one memory storing instructions that, when executed by the at least one processor, to cause the apparatus at least to:

transmit, to an access node, a report indicating capability regarding detecting radio parameters, wherein the report comprises at least one of the following: a first set of radio parameters, a second set of radio parameters and a third set of radio parameters, and wherein the apparatus is capable to determine first set of radio parameters in a complete manner, determine the second set of radio parameters in the complete manner when at least one of the following assistance information, a first configuration or an indication related to the radio parameters is available, and determine the third set of radio parameters in the complete manner when a second configuration related to detecting the radio parameters is available at least during an initial configuration for receiving the downlink channel transmission or for a pre-determined time period, and the third set of radio parameters follow, at least substantially, the behavior of the first and the second set of radio parameters, receive, from the access node, for determining the second set of radio parameters, at least one of the following: the assistance information, the first configuration or the indication for determining the second set of parameters for receiving a downlink channel transmission, and receive, from the access node, the downlink channel transmission.

According to a third aspect there is provided a method comprising: transmitting, to an access node, a report indicating capability, of an apparatus, regarding detecting radio parameters, wherein the report comprises at least one of the following: a first set of radio parameters, a second set of radio parameters and a third set of radio parameters, and wherein the apparatus is capable to determine first set of radio parameters in a complete manner, determine the second set of radio parameters in the complete manner when at least one of the following assistance information, a first configuration or an indication related to the radio parameters is available, and determine the third set of radio parameters in the complete manner when a second configuration related to detecting the radio parameters is available at least during an initial configuration for receiving the downlink channel transmission or for a pre-determined time period, and the third set of radio parameters follow, at least substantially, the behavior of the first and the second set of radio parameters, receiving, from the access node, for determining the second set of radio parameters, at least one of the following: assistance information, the first configuration or the indication for determining the second set of parameters for receiving a downlink channel transmission, and receiving, from the access node, the downlink channel transmission.

In some example embodiments according to the third aspect, the method is a computer-implemented method.

According to a fourth aspect there is provided a computer program comprising instructions for causing an apparatus to perform at least the following: transmit, to an access node, a report indicating capability regarding detecting radio parameters, wherein the report comprises at least one of the following: a first set of radio parameters, a second set of radio parameters and a third set of radio parameters, and wherein the apparatus is capable to determine first set of radio parameters in a complete manner, determine the second set of radio parameters in the complete manner when at least one of the following assistance information, a first configuration or an indication related to the radio parameters is available, and determine the third set of radio parameters in the complete manner when a second configuration related to detecting the radio parameters is available at least during an initial configuration for receiving the downlink channel transmission or for a pre-determined time period, and the third set of radio parameters follow, at least substantially, the behavior of the first and the second set of radio parameters, receive, from the access node, for determining the second set of radio parameters, at least one of the following: the assistance information, the first configuration or the indication for determining the second set of parameters for receiving a downlink channel transmission, and receive, from the access node, the downlink channel transmission.

According to a fifth aspect there is provided a computer program comprising instructions stored thereon for performing at least the following: transmitting, to an access node, a report indicating capability, of an apparatus, regarding detecting radio parameters, wherein the report comprises at least one of the following: a first set of radio parameters, a second set of radio parameters and a third set of radio parameters, and wherein the apparatus is capable to determine first set of radio parameters in a complete manner, determine the second set of radio parameters in the complete manner when at least one of the following assistance information, a first configuration or an indication related to the radio parameters is available, and determine the third set of radio parameters in the complete manner when a second configuration related to detecting the radio parameters is available at least during an initial configuration for receiving the downlink channel transmission or for a pre-determined time period, and the third set of radio parameters follow, at least substantially, the behavior of the first and the second set of radio parameters, receiving, from the access node, for determining the second set of radio parameters, at least one of the following: the assistance information, the first configuration or the indication for determining the second set of parameters for receiving a downlink channel transmission, and receiving, from the access node, the downlink channel transmission.

According to a sixth aspect there is provided a non-transitory computer readable medium comprising program instructions for causing an apparatus to perform at least the following: transmit, to an access node, a report indicating capability regarding detecting radio parameters, wherein the report comprises at least one of the following: a first set of radio parameters, a second set of radio parameters and a third set of radio parameters, and wherein the apparatus is capable to determine first set of radio parameters in a complete manner, determine the second set of radio parameters in the complete manner when at least one of the following assistance information, a first configuration or an indication related to the radio parameters is available, and determine the third set of radio parameters in the complete manner when a second configuration related to detecting the radio parameters is available at least during an initial configuration for receiving the downlink channel transmission or for a pre-determined time period, and the third set of radio parameters follow, at least substantially, the behavior of the first and the second set of radio parameters, receive, from the access node, for determining the second set of radio parameters, at least one of the following: the assistance information, the first configuration or the indication for determining the second set of parameters for receiving a downlink channel transmission, and receive, from the access node, the downlink channel transmission.

According to a seventh aspect there is provided a non-transitory computer readable medium comprising program instructions stored thereon for performing at least the following: transmitting, to an access node, a report indicating capability, of an apparatus, regarding detecting radio parameters, wherein the report comprises at least one of the following: a first set of radio parameters, a second set of radio parameters and a third set of radio parameters, and wherein the apparatus is capable to determine first set of radio parameters in a complete manner, determine the second set of radio parameters in the complete manner when at least one of the following assistance information, a first configuration or an indication related to the radio parameters is available, and determine the third set of radio parameters in the complete manner when a second configuration related to detecting the radio parameters is available at least during an initial configuration for receiving the downlink channel transmission or for a pre-determined time period, and the third set of radio parameters follow, at least substantially, the behavior of the first and the second set of radio parameters, receiving, from the access node, for determining the second set of radio parameters, at least one of the following: the assistance information, the first configuration or the indication for determining the second set of parameters for receiving a downlink channel transmission, and receiving, from the access node, the downlink channel transmission.

According to an eighth aspect there is provided a computer readable medium comprising program instructions stored thereon for performing at least the following: transmitting, to an access node, a report indicating capability, of an apparatus, regarding detecting radio parameters, wherein the report comprises at least one of the following: a first set of radio parameters, a second set of radio parameters and a third set of radio parameters, and wherein the apparatus is capable to determine first set of radio parameters in a complete manner, determine the second set of radio parameters in the complete manner when at least one of the following assistance information, a first configuration or an indication related to the radio parameters is available, and determine the third set of radio parameters in the complete manner when a second configuration related to detecting the radio parameters is available at least during an initial configuration for receiving the downlink channel transmission or for a pre-determined time period, and the third set of radio parameters follow, at least substantially, the behavior of the first and the second set of radio parameters, receiving, from the access node, for determining the second set of radio parameters, at least one of the following: the assistance information, the first configuration or the indication for determining the second set of parameters for receiving a downlink channel transmission, and receiving, from the access node, the downlink channel transmission.

According to a ninth aspect there is provided an apparatus comprising means for: receiving, from a terminal device, a report indicating capability of the terminal device to detect radio parameters, wherein the report comprises at least one of the following: a first set of radio parameters, a second set of radio parameters and a third set of radio parameters, and wherein the terminal device is capable to determine first set of radio parameters in a complete manner, determine the second set of radio parameters in the complete manner when at least one of the following assistance information, a first configuration or an indication related to the radio parameters is available, and determine the third set of radio parameters in the complete manner when a second configuration related to detecting the radio parameters is available at least during an initial configuration for receiving the downlink channel transmission or for a pre-determined time period, and the third set of radio parameters follow, at least substantially, the behavior of the first and the second set of radio parameters, determining, based on the received report, third configuration related to detecting the radio parameters for the terminal device, transmitting, to the terminal device, the third configuration related to detecting the radio parameters, wherein the third configuration comprises, for determining the second set of radio parameters, at least one of the following: the assistance information, the first configuration or the indication for determining the second set of parameters for receiving a downlink channel transmission, and transmitting a downlink channel transmission to the terminal device.

In some example embodiments according to the ninth aspect, the means comprises at least one processor, and at least one memory storing instructions that, when executed by the at least one processor, to cause the performance of the apparatus.

According to a tenth aspect there is provided an apparatus comprising at least one processor, and at least one memory storing instructions that, when executed by the at least one processor, to cause the apparatus at least to: receive, from a terminal device, a report indicating capability of the terminal device to detect radio parameters, wherein the report comprises at least one of the following: a first set of radio parameters, a second set of radio parameters and a third set of radio parameters, and wherein the terminal device is capable to determine first set of radio parameters in a complete manner, determine the second set of radio parameters in the complete manner when at least one of the following assistance information, a first configuration or an indication related to the radio parameters is available, and determine the third set of radio parameters in the complete manner when a second configuration related to detecting the radio parameters is available at least during an initial configuration for receiving the downlink channel transmission or for a pre-determined time period, and the third set of radio parameters follow, at least substantially, the behavior of the first and the second set of radio parameters, determine, based on the received report, third configuration related to detecting the radio parameters for the terminal device, transmit, to the terminal device, the third configuration related to detecting the radio parameters, wherein the third configuration comprises, for determining the second set of radio parameters, at least one of the following: the assistance information, the first configuration or the indication for determining the second set of parameters for receiving a downlink channel transmission, and transmit a downlink channel transmission to the terminal device.

According to an eleventh aspect there is provided a method comprising: receiving, from a terminal device, a report indicating capability of the terminal device to detect radio parameters, wherein the report comprises at least one of the following: a first set of radio parameters, a second set of radio parameters and a third set of radio parameters, and wherein the terminal device is capable to determine first set of radio parameters in a complete manner, determine the second set of radio parameters in the complete manner when at least one of the following assistance information, a first configuration or an indication related to the radio parameters is available, and determine the third set of radio parameters in the complete manner when a second configuration related to detecting the radio parameters is available at least during an initial configuration for receiving the downlink channel transmission or for a pre-determined time period, and the third set of radio parameters follow, at least substantially, the behavior of the first and the second set of radio parameters, determining, based on the received report, third configuration related to detecting the radio parameters for the terminal device, transmitting, to the terminal device, the third configuration related to detecting the radio parameters, wherein the third configuration comprises, for determining the second set of radio parameters, at least one of the following: the assistance information, the first configuration or the indication for determining the second set of parameters for receiving a downlink channel transmission, and transmitting a downlink channel transmission to the terminal device.

In some example embodiments according to the eleventh aspect, the method is a computer-implemented method.

According to a twelfth aspect there is provided a computer program comprising instructions for causing an apparatus to perform at least the following: receive, from a terminal device, a report indicating capability of the terminal device to detect radio parameters, wherein the report comprises at least one of the following: a first set of radio parameters, a second set of radio parameters and a third set of radio parameters, and wherein the terminal device is capable to determine first set of radio parameters in a complete manner, determine the second set of radio parameters in the complete manner when at least one of the following assistance information, a first configuration or an indication related to the radio parameters is available, and determine the third set of radio parameters in the complete manner when a second configuration related to detecting the radio parameters is available at least during an initial configuration for receiving the downlink channel transmission or for a pre-determined time period, and the third set of radio parameters follow, at least substantially, the behavior of the first and the second set of radio parameters, determine, based on the received report, third configuration related to detecting the radio parameters for the terminal device, transmit, to the terminal device, the third configuration related to detecting the radio parameters, wherein the third configuration comprises, for determining the second set of radio parameters, at least one of the following: the assistance information, the first configuration or the indication for determining the second set of parameters for receiving a downlink channel transmission, and transmit a downlink channel transmission to the terminal device.

According to a thirteenth aspect there is provided a computer program comprising instructions stored thereon for performing at least the following: receiving, from a terminal device, a report indicating capability of the terminal device to detect radio parameters, wherein the report comprises at least one of the following: a first set of radio parameters, a second set of radio parameters and a third set of radio parameters, and wherein the terminal device is capable to determine first set of radio parameters in a complete manner, determine the second set of radio parameters in the complete manner when at least one of the following assistance information, a first configuration or an indication related to the radio parameters is available, and determine the third set of radio parameters in the complete manner when a second configuration related to detecting the radio parameters is available at least during an initial configuration for receiving the downlink channel transmission or for a pre-determined time period, and the third set of radio parameters follow, at least substantially, the behavior of the first and the second set of radio parameters, determining, based on the received report, third configuration related to detecting the radio parameters for the terminal device, transmitting, to the terminal device, the third configuration related to detecting the radio parameters, wherein the third configuration comprises, for determining the second set of radio parameters, at least one of the following: the assistance information, the first configuration or the indication for determining the second set of parameters for receiving a downlink channel transmission, and transmitting a downlink channel transmission to the terminal device.

According to a fourteenth aspect there is provided a non-transitory computer readable medium comprising program instructions for causing an apparatus to perform at least the following: receive, from a terminal device, a report indicating capability of the terminal device to detect radio parameters, wherein the report comprises at least one of the following: a first set of radio parameters, a second set of radio parameters and a third set of radio parameters, and wherein the terminal device is capable to determine first set of radio parameters in a complete manner, determine the second set of radio parameters in the complete manner when at least one of the following assistance information, a first configuration or an indication related to the radio parameters is available, and determine the third set of radio parameters in the complete manner when a second configuration related to detecting the radio parameters is available at least during an initial configuration for receiving the downlink channel transmission or for a pre-determined time period, and the third set of radio parameters follow, at least substantially, the behavior of the first and the second set of radio parameters, determine, based on the received report, third configuration related to detecting the radio parameters for the terminal device, transmit, to the terminal device, the third configuration related to detecting the radio parameters, wherein the third configuration comprises, for determining the second set of radio parameters, at least one of the following: the assistance information, the first configuration or the indication for determining the second set of parameters for receiving a downlink channel transmission, and transmit a downlink channel transmission to the terminal device.

According to a fifteenth aspect there is provided a non-transitory computer readable medium comprising program instructions stored thereon for performing at least the following: receiving, from a terminal device, a report indicating capability of the terminal device to detect radio parameters, wherein the report comprises at least one of the following: a first set of radio parameters, a second set of radio parameters and a third set of radio parameters, and wherein the terminal device is capable to determine first set of radio parameters in a complete manner, determine the second set of radio parameters in the complete manner when at least one of the following assistance information, a first configuration or an indication related to the radio parameters is available, and determine the third set of radio parameters in the complete manner when a second configuration related to detecting the radio parameters is available at least during an initial configuration for receiving the downlink channel transmission or for a pre-determined time period, and the third set of radio parameters follow, at least substantially, the behavior of the first and the second set of radio parameters, determining, based on the received report, third configuration related to detecting the radio parameters for the terminal device, transmitting, to the terminal device, the third configuration related to detecting the radio parameters, wherein the third configuration comprises, for determining the second set of radio parameters, at least one of the following: the assistance information, the first configuration or the indication for determining the second set of parameters for receiving a downlink channel transmission, and transmitting a downlink channel transmission to the terminal device.

According to a sixteenth aspect there is provided a computer readable medium comprising program instructions stored thereon for performing at least the following: receiving, from a terminal device, a report indicating capability of the terminal device to detect radio parameters, wherein the report comprises at least one of the following: a first set of radio parameters, a second set of radio parameters and a third set of radio parameters, and wherein the terminal device is capable to determine first set of radio parameters in a complete manner, determine the second set of radio parameters in the complete manner when at least one of the following assistance information, a first configuration or an indication related to the radio parameters is available, and determine the third set of radio parameters in the complete manner when a second configuration related to detecting the radio parameters is available at least during an initial configuration for receiving the downlink channel transmission or for a pre-determined time period, and the third set of radio parameters follow, at least substantially, the behavior of the first and the second set of radio parameters, determining, based on the received report, third configuration related to detecting the radio parameters for the terminal device, transmitting, to the terminal device, the third configuration related to detecting the radio parameters, wherein the third configuration comprises, for determining the second set of radio parameters, at least one of the following: the assistance information, the first configuration or the indication for determining the second set of parameters for receiving a downlink channel transmission, and transmitting a downlink channel transmission to the terminal device.

LIST OF DRAWINGS

In the following, the invention will be described in greater detail with reference to the embodiments and the accompanying drawings, in which FIG. 1 illustrates an example embodiment of a radio access network.

FIG. 5 illustrates a signaling chart according to an example embodiment.

DESCRIPTION OF EMBODIMENTS

Figure 1:
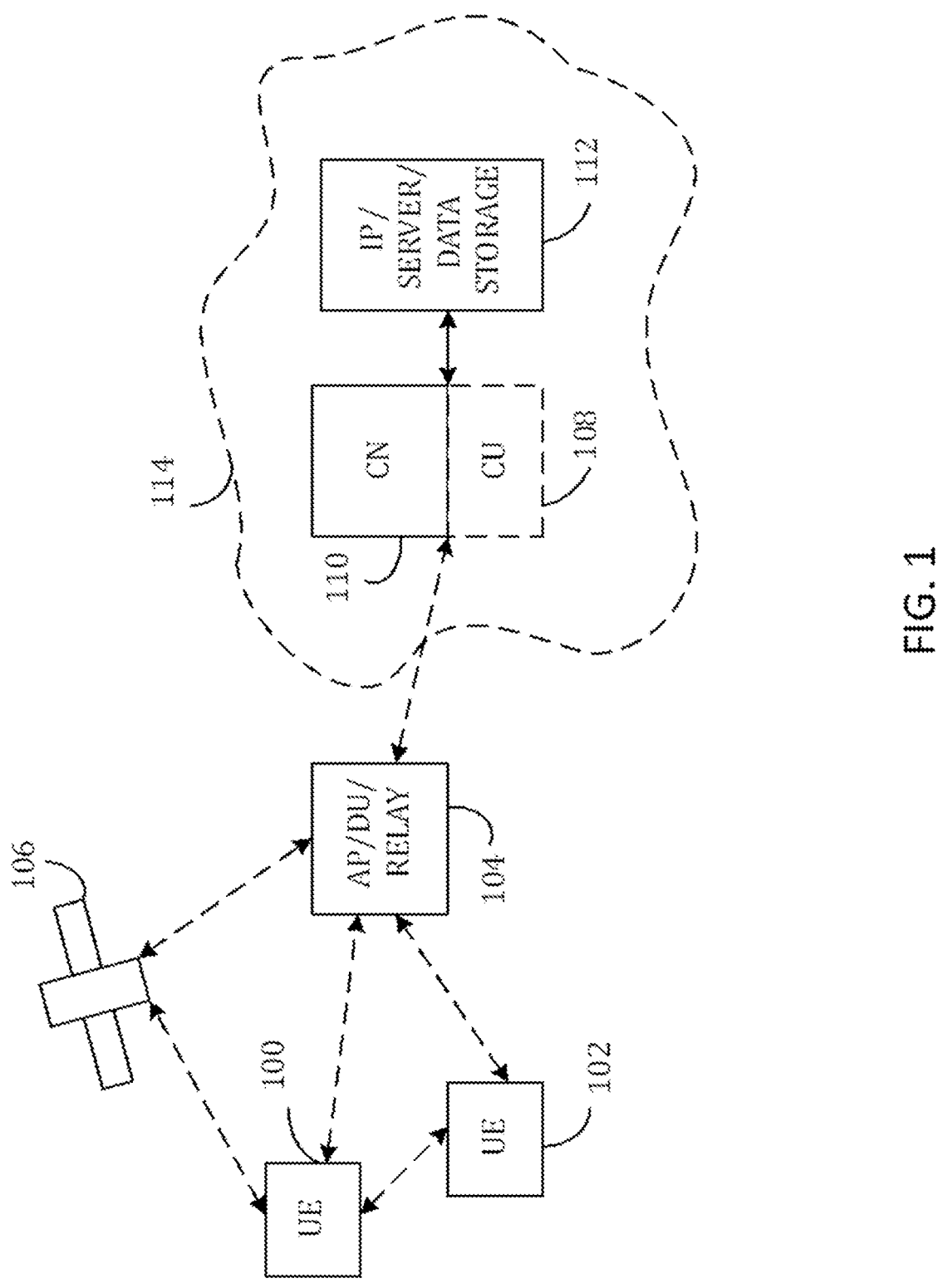

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. Also, as used herein, "at least one of the following: <a list of two or more elements>" and similar wording, where the list of two or more elements are joined by "and" or "or", mean at least any of the elements, or at least any two or more of the elements, or at least all the elements.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G), as well as 5G-Advanced (i.e. 3GPP NR Rel-18 and beyond), mobile or cellular communication system. Also, the embodiments described herein may be implemented in a 6G communication system as well. The embodiments are not, however, restricted to the system given as an example but a person skilled in the art may apply the solution to other communication systems provided with necessary properties.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The wireless link from a terminal device to a (e/g)NodeB is called uplink or reverse link and the wireless link from the (e/g) NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g) NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via HAP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require bringing the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/ mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling or service availability in areas that do not have terrestrial coverage. Satellite communication may utilise geostationary earth orbit (GEO) satellite systems, but also low earth orbit (LEO) satellite systems, for example, mega-constellations. A satellite 106 comprised in a constellation may carry a gNB, or at least part of the gNB, that create on-ground cells. Alternatively, a satellite 106 may be used to relay signals of one or more cells to the Earth. The on-ground cells may be created through an on-ground relay node 104 or by a gNB located on-ground or in a satellite or part of the gNB may be on a satellite, the DU for example, and part of the gNB may be on the ground, the CU for example. Additionally, or alternatively, high-altitude platform station, HAPS, systems may be utilized.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In some exemplary embodiments, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network may aggregate traffic from a large number of HNBs back to a core network.

Configuration of a terminal device may be performed in various manners. For example, a 3GPP 5G specification may offer such variety of configuration options that a radio resource control (RRC) configuration message size may be more than 2000 bytes. Additionally, as features are added, the size of capabilities of the terminal device also increase. Thus, there may be thousands of radio parameters for configuring a terminal device in accordance with its capabilities and the radio parameters are carried in configuration messages transmitted between the terminal device and the network. Consequently, there may be a significant overhead associated with signalling such as RRC, medium access control (MAC) and/or downlink control information (DCI) signalling, as a large set of parameters is to be received by the terminal device from the network such that transmissions are then received correctly. The transmissions may be for example at least one of the following: data, control and reference signal transmissions. Yet, such signalling requires resources and minimizing the usage of those resources would help to achieve better cell throughput and latency.

Thus, in an example embodiment, machine learning (ML) model is utilized to help to reduce signalling related to the radio parameters required for configuring the terminal device. In this example embodiment, the terminal device reports its capability of determining radio parameters of downlink (DL) channels based on, at least partly, usage of ML model. It is to be noted that determining radio parameters may also be understood as determining scheduling related parameters. Also, determining may be understood as detecting, predicting or estimating the radio parameters. The capabilities of the terminal device may comprise various aspects. For example, the terminal device may be able to detect a first set of radio parameters completely, in other words, in a full manner. When radio parameters are detected in a full manner, the radio parameters are detected completely without needing any configuration of the radio parameters. The first set of radio parameters may comprise for example one or more of the following: quasi-colocation (QCL) information for receiving control channels, such as control resource set (CORESET) and/or physical downlink control channel (PDCCH), data channels, such as physical downlink shared channel (PDSCH), and reference signal such as channel state information reference signal (CSI-RS), CSI information such as precoding matrix information (PMI) and rank, time-domain resources and/or allocation for data-, control-, and/or reference signals, frequency domain resources and/or allocation for data-, control-, and/or reference signals, power ratios between control and/or data channels and different reference signals and rate matching patterns.

In addition to detecting the first set of radio parameters completely, the terminal device may be capable of detecting a second set of parameters in a partial manner. Detecting radio parameters partially may be understood as the terminal device requiring availability of assistance information from the network to detect the second set of parameters in a complete manner. Alternatively, or additionally to the assistance information, one or more of the following may be required from the network for the radio parameter detection: configuration and indication to determine interpretation for the radio parameters. The second set of radio parameters may comprise for example one or more of the following radio parameters: modulation order of a modulation and coding scheme (MCS) and CSI information such as PMI and rank. It is to be noted that the terminal device may require knowing the exact MCS table and/or coding rate as assistance information for interpreting detected MCS.

The terminal device may then determine a third set of radio parameters. The terminal device may be capable of detecting the third set of parameter in the complete manner when a configuration related to detecting the radio parameters is available at least during an initial configuration for receiving the downlink channel transmission or for a predetermined time period, and the third set of radio parameters follow, at least substantially, the behavior of the first and the second set of radio parameters The third set of radio parameters may be determined based on a machine learning model, which may be any suitable machine learning model. The machine learning model may then be trained or updated to detect the third set of radio parameters and the radio parameters in the third set of radio parameters may comprise for example one or more of the following: MCS, PMI, time-domain resources and/or allocation for reference signals, and scrambling sequence information for various channels and signals, such a random access channel (RACH) or uplink or downlink reference signals. As for MCS, the terminal device may utilize as a starting point the modulation information from the first and/or second set of radio parameters may improve the MCS scheme based on the ML model. The final MCS may not be part of the parameterized MCS but rather the output of the leaning process between the terminal device and the network, which may be understood to as an access node as well. As for the PMI, that may also be an output of the training the ML model regarding the process between the terminal device and the network. As for reference signals, the machine learning model may utilize as a starting point the reference signal information from the first and second radio parameter set and then the ML model may be used to predict future patterns of reference signals.

Thus, in this example embodiment, the determining the radio parameters of the first and the second radio parameter set is based on a parameterized solution, in other words, using explicit configuration parameters or information elements (IEs) and making use of network assistance, which may be dynamic or semi-static, and, additionally or alternatively, make use of a specification of the network.

The third set of radio parameters are then, in this example embodiment, determined based on non-parametrized solutions that complement the determination of the first and the second radio parameter sets. Thus, in this example embodiment, the terminal device reports to the network its capability. The reporting from the terminal device to the network may be received by the access node that is comprised in the network. Based on the reporting, and when configuring or indicating different sets of radio parameters towards the terminal device, the network may not report configure or indicate, using for example RRC, MAC control element

15

(CE) or, DCI, at least one or more first set of radio parameters to the terminal device for receiving DL channels. Yet, the network may indicate, for example using RRC, MAC-CE- or DCI, at least one assistance information or minimal configuration and/or indication to the terminal device to determine one or more second set of parameters for receiving DL channels. Further, the network may configure or indicate using RRC, MAC-CE or DCI, at least one third set of radio parameters to the terminal device for pre-defined and/or configured time period, or in the initial configuration for receiving DL channels, after which, or in the next (re-)configuration instance, such configuration or indication via RRC, MAC-CE or DCI may not be used towards the terminal device for scheduling and/or transmitting DL channels.

In this example embodiment, the network may assume that the not configured parameters, or partially configured parameters are detected by the terminal device on the radio parameter detection. It is to be noted that that the radio parameters may also be understood as scheduling parameters. The network may also use a feedback mechanism towards the terminal device for the terminal device to confirm whether the radio parameters were successfully detected or not. The feedback may be triggered by the network or by the terminal device. The feedback mechanism may be used for each scheduling or transmission instance or multiple scheduling or, alternatively, for transmission instances. If the feedback mechanism is triggered by the network, then it may operate in addition to a hybrid automatic repeat request (HARQ) procedure towards the terminal device. In case the feedback mechanism is triggered by the terminal device, then failure of detection of a radio parameter, or radio parameters, may be indicated in reception failures of data, control or reference signal. Such indication may be the only indication of the failure.

Figure 2:
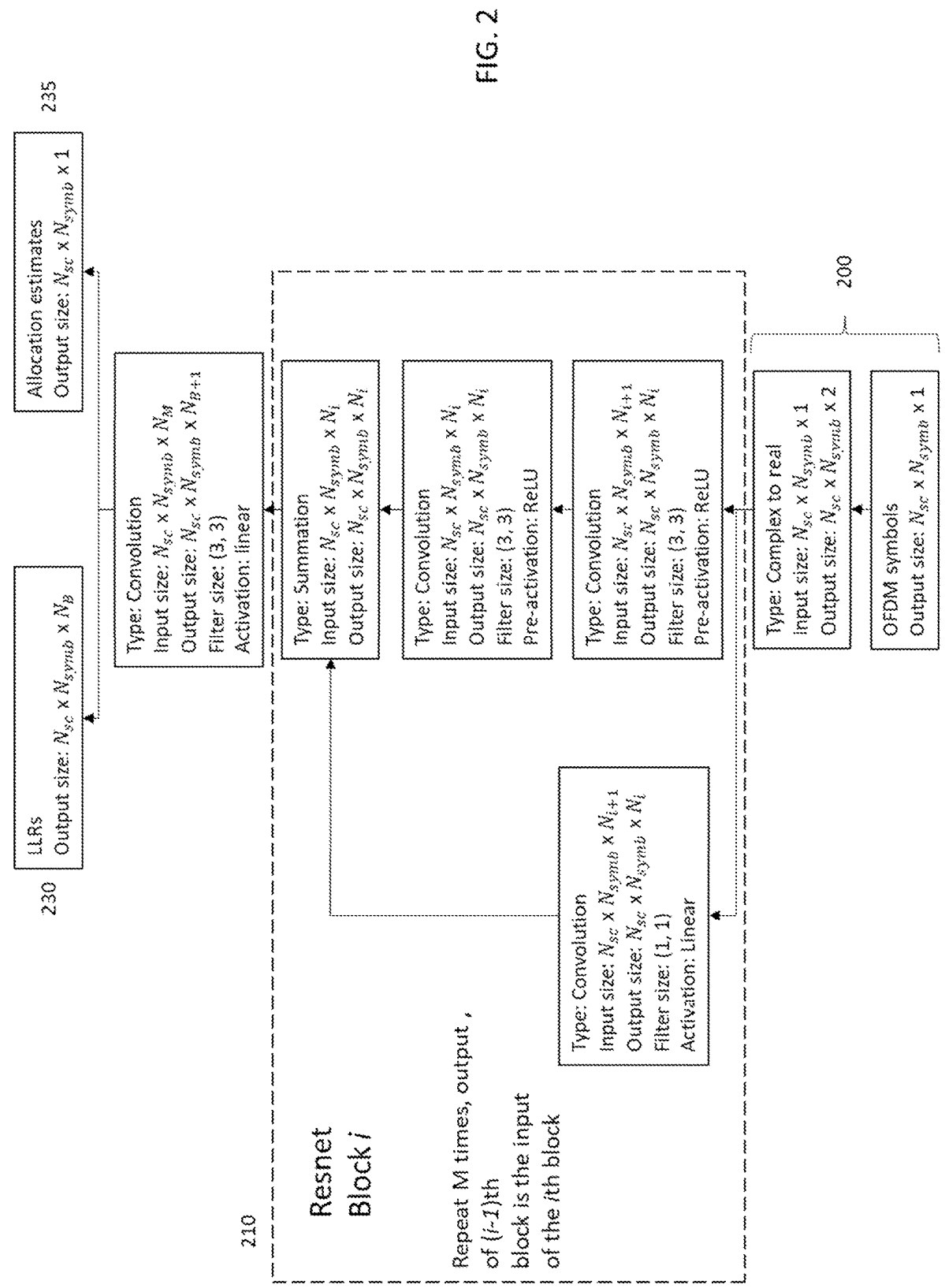
FIG. 2 illustrates an example embodiment of a receiver of the terminal device that is a machine learning-based receiver.

In another example embodiment, a terminal device may determine radio parameters for time-division and frequency-division resource allocation. The determination may be performed based on a received resource element (RE) grid of an active bandwidth part (BWP). In this example, the terminal device uses a ML model to determine at least some of the radio parameters. FIG. 2 illustrates an example embodiment of a receiver of the terminal device that is an ML-based receiver, which in this example embodiment is based on using a residual neural network (ResNet). It is to be noted that in this example embodiment, for the sake of explanation, the terminal device utilizes one receiver (Rx) antenna. Yet, it is to be noted that more Rx antennas could also be utilized by the terminal device. In this example embodiment, the number of received sub carriers on the active BWP is denoted as $N_{sc}$, $N_{symb}$ is the number of OFDM symbols in a slot, for example 14, $N_1 \ldots N_{j+k+l}$ denote the numbers of output channels in convolutional layers inside individual ResNet blocks and $N_B$ denotes the number of bits per RE. In this example, one ResNet block 210 is illustrated.

In this example embodiment, the receiver receives as its input 200 data after a Fast Fourier Transformation (post-FFT) covering the active BWP over a single slot. In this example embodiment, no other input data is provided to the receiver. In this example embodiment, the convolutional ResNet architecture is followed. In this example embodiment, the output of the receiver comprises two arrays, 230 and 235. The output array 230 comprises the estimated log-likelihood ratios (LLRs) over the whole active BWP. The output array 235 comprises allocation estimates for the whole BWP, represented as probabilities between 0 and 1. For example, the resource allocation may be assumed to have occurred on those REs for which the allocation probability estimate is larger than 0.5. The LLRs of the corresponding LLRs are then extracted from the BWP LLR array. It is to be noted that the receiver may output the LLRs for the whole BWP, even if what is used in a subset of the BWP. The LLRs of the unused REs may then be noise, which are discarded based on the allocation estimates.

Figures 3, 4:
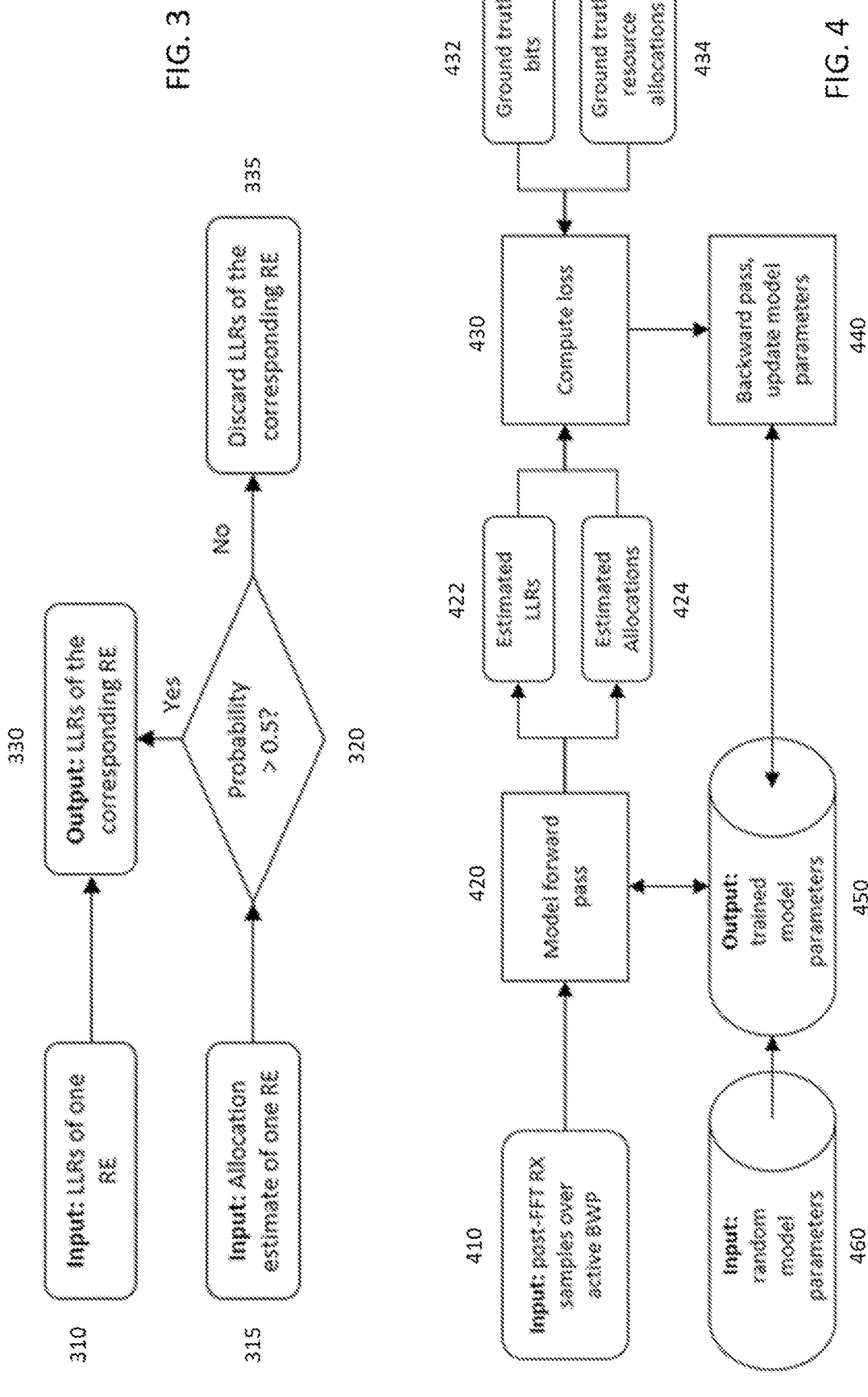
FIG. 3 illustrates an example embodiment for a probability-based selection of log-likelihood ratios based on an allocation estimated for a resource element.
FIG. 4 illustrates an example embodiment of training a machine learning-based receiver with an allocation estimation.

FIG. 3 illustrates an example embodiment for a probability-based selection of LLRs based on an allocation estimated for an RE. In this example embodiment, the allocation estimate output is interpreted by assuming that a terminal device has been allocated data on a contiguous frequency band. Thus, an approach corresponding to low-pass filtering of the allocation estimates over the REs may be utilized, as any intermittent allocation estimates of low probability between estimates of high probability may be considered as outliers and ignored. Instead, the starting point of the resource allocation, as well as the ending point, may be detected. It is also possible to train the ML receiver to provide directly the starting physical resource block (PRB) of the allocation, together with the end PRB.

Thus, in this example embodiment, there is an input 310 that is the LLRs of one RE and the input 315 that is an allocation estimate of one RE. It is then determined, for the input 315, at decision block 320 is the probability is greater than a threshold value such as 0,5. If yes, then the output 330 is the LLRs of the corresponding RE. If not, then the result 335 is to discard the LLRs of the corresponding RE. Thus, for the input 310, the output 330 may be determined based on the output 330 corresponding to the input 310.

In case an ML receiver is used, then the receiver may be trained offline, that is, when the terminal device is not connected to the network. FIG. 4 illustrates an example embodiment of training the ML receiver with allocation estimation. In this example embodiment, a loss function may be used and it may be chosen to be the binary cross entropy, which is obtained as follows:

$$CE_q(\theta) = -\frac{1}{W_q} \sum_{i=0}^{W_q-1} \left( b_{iq}\log(\hat{b}_{iq}) + (1-b_{iq})\log(1-\hat{b}_{iq}) \right)$$

where q is the sample index within the batch, $b_{iq}$ is the ground truth binary value, $\hat{b}_{iq}$ is the estimated bit, and $W_q$ is the total number bits. Further, $\theta$ denotes the set of all trainable parameters, comprising of the DeepRx model weights. It is to be noted that the same loss function may be used both for the received bits as well as for the allocation estimates, since the latter may also be represented as a binary classification problem, in other words, either the RE is allocated for the terminal device, or it is not. Also, when calculating the loss corresponding to the received bits, it may be done only for those REs that are allocated for the data transmission. In the training phase this may be done for example by using the known allocation. During validation, the received bits and/or LLRs may be extracted using the allocation estimates. Alternatively, the ground truth allocation may include only the starting PRB of the allocation, together with the end PRB. This may still be a binary array of same size as the full allocation array, but with 1s only on the REs where the allocation starts, and where it ends.

The training the ML-based receiver may be started with initializing trainable weights of the receiver. This may be done, e.g., with random initialization and the trainable weights may be collected into a vector $\theta$.

Obtain a batch of training data, consisting of the frequency-domain RX signal with resource allocation, random channel conditions, random transmit message, etc. The choice of batch size should be done, e.g., based on available memory or observed training performance. Net, the input 410 is obtained. In this example embodiment, the input 410 comprises post-FFT RX samples over active BWP. Next, in model pass forward block 420, the obtained input data is fed through the ML receiver. Thus, in block 422 LLRs are estimated and in block 424 allocations are estimated. In block 430 then losses are computed. This may comprise calculating the cross-entropy loss for the training data using binary cross entropy loss function as described above. As input for the loss computing, ground truth bits 432 and ground truth resource allocations 434 may be obtained. After that, in block 440, backward pass is performed and model parameters are updated. In other words, the gradient of the loss is calculated with respect to the trainable network parameters θ (this is the so-called backward pass) and update the parameters with stochastic gradient descent (SGD) rule, using a predefined learning rate. For example, so-called Adam optimizer may be used. In case a pre-defined stop condition is met, the training may be terminated, otherwise, the training may be continued. The stop condition may be a pre-defined number of iterations for example, or it may be a certain loss value or any other suitable performance criterion. Thus, once, the training is completed, the output 450 is obtained and trained model parameters are obtained such that an input 460 that comprises random model parameters, may be classified using the trained model. It is to be noted that the model may be updated by re-training as well.

FIG. 5 illustrates a signaling chart according to an example embodiment. The signaling in this example embodiment is between an access node 500, that is comprised in a network and may thus also be referred to as network 500, and a terminal device 505. In this example embodiment, the terminal device 505 is aware of modulation and coding rates which are used by default. This awareness may be achieved for example by hardcoding the default values according to a specification. The terminal device 505 may then indicate, using the transmission 510, its capability regarding determining radio parameters. In other words, the terminal device 505 may transmit a report indicating its capability of detecting radio parameters to the access node 500. The radio parameters may be categorized into a first set of radio parameters that the terminal device 505 is capable of determining completely by detecting those, to a second set of radio parameters that the terminal device 505 is capable of determining partially meaning that the second set of radio parameters may be detected in a complete manner by detecting those with assistance from the network 500 and to a third set of radio parameters that the terminal device 505 is capable of determining in the complete manner when a full configuration related to detecting the radio parameters is available at least during an initial configuration for receiving the downlink channel transmission or for a pre-determined time period, and the third set of radio parameters follow, at least substantially, the behavior of the first and the second set of radio parameters. The full configuration may be understood as configuring determination of the first, the second and the third set of radio parameters. It is to be noted that a machine learning model may be trained and utilized for determining one or more of the first, second and the third set of radio parameters.

Based on the received report, the network 500 may then determine 515 a configuration (and optionally also related indications) towards the terminal device 505 and transmit it using the transmission 520. When determining 515 the configuration (and optionally also related indications) towards the terminal device, the network 505 may consider the first set of radio parameters as something that network can avoid configuring and/or indicating to the terminal device 505 while second and third sets of radio parameters shall be at least configured to the terminal device at least in some form. In the transmission 520 the configuration of the parameters may comprise assistance information for the radio parameters comprised in the second set of radio parameters and radio parameters in the third set of radio parameters that may then be used for the machine learning. For example, if the modulation and coding scheme (MCS) can be detected by the terminal device 505, the transmission 520 may configure a MCS table (which may be referred to as the assistance information) that associated with the modulation and coding scheme (which may be referred to as the second set of radio parameter) and the MCS for the transmission of a transport block is not indicated by the network 500 to the terminal device 505, the terminal device 505 may still be able to detect the used modulation for the transmission of the transport block. In one variant, the related indications that associated with the configurations of second set of radio parameters and third set of radio parameters may also be sent transmission 520 or separately from the transmission 520. Considering the same example of MCS, in order to alleviate complexity of the terminal device 505, the network 500 may provide related indication or network assistance by informing the terminal device 505 the modulation order or the coding rate, letting the terminal device 505 perform the full detection of the MCS.

As the network 500 may now assume that the radio parameters of the first and the second radio parameter sets are detected by the terminal device 505, the network 500 may the provide the transmission 525 comprising a downlink channel transmission that may be PDCCH and/or PDSCH transmission. The terminal device 505 then determines 530 the first set and the second set of radio parameters by detecting them. Based on the detected first and second set of parameters, and optionally also based on other configured or indicated radio parameters, the terminal device 505 may then receive 535 the transmitted downlink channel. Consequently, the terminal device 505 may transmit the transmission 540 that comprises a report for HARQ data reception. After, this, there may be further transmissions 545 between the network 500 and the terminal device 505 of control, data and/or reference signals towards the terminal device 505. The terminal device 505 then transmits the transmission 550 comprising a report of success of the parameter detection. For example, if the terminal device 505 is capable of machine learning, it may optimize further the modulation, in-or-outside the bounds of the indicated or hardcoded modulation information.

Based on the transmission 550, the network 500 may then determine 555 that the third set of radio parameters is not required for the terminal device 505. For example, if the terminal device 505 is operating with 64 QAM and is aware of a set of coding rates, it may have the capability to learn unspecified coding rates for a known modulation, which are also not signalled to the terminal device 505 by the network 500. This ML learning process may take place as a learning process between the terminal device 505 and access node 500. Similarly, the terminal device 505 may be able to learn unspecified modulation for a set of known coding rates.

The network 500 may then provide the transmission 560 comprising downlink channel transmission such as PDCCH or PDSCH transmission. It is now assumed that the radio parameters of the first, second and third set of radio parameters are determined by the terminal device 505. The terminal device 505 may then determine 562 the first, second and third set of radio parameters and also receive 564 the downlink channel transmission based on the determined first, second and third set of radio parameters and optionally also based on other indicated of configured radio parameters. The terminal device 505 may then transmit the transmission 570 to report the HARQ for data reception and further transmission 575 of control, data and/or reference signals towards the terminal device 505 may take place after which the terminal device 505 may report success of parameter detection 580. For example, the terminal device 505 may be able to learn unspecified modulation and coding rates. Starting from a symmetrical constellation, the terminal device 505 based on a ML process together with the access node 500, may learn a new, unspecified constellation, which may be also an asymmetric constellation with regard to what has been used as input during the learning process. Alternatively, the starting of the leaning process may be based on a set of asymmetric constellations which are further optimized by the ML learning that has as an output an unspecified MCS.

Figures 6, 7:
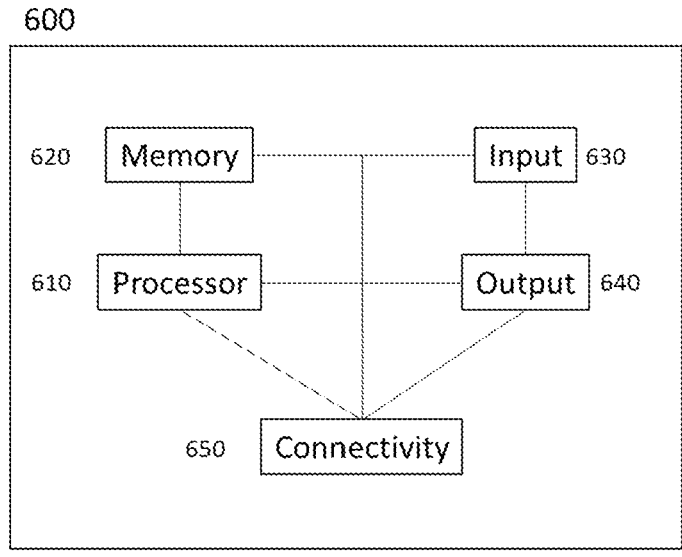
FIG. 6 and FIG. 7 illustrate example embodiment of an apparatus.

FIG. 6 illustrates an apparatus 600, which may be an apparatus such as, or comprised in, a terminal device, according to an example embodiment. The apparatus 600 comprises a processor 610. The processor 610 interprets computer program instructions and processes data. The processor 610 may comprise one or more programmable processors. The processor 610 may comprise programmable hardware with embedded firmware and may, alternatively or additionally, comprise one or more application specific integrated circuits, ASICs.

The processor 610 is coupled to a memory 620. The processor is configured to read and write data to and from the memory 620. The memory 620 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 620 stores computer readable instructions that are execute by the processor 610. For example, non-volatile memory stores the computer readable instructions and the processor 610 executes the instructions using volatile memory for temporary storage of data and/or instructions.

The computer readable instructions may have been pre-stored to the memory 620 or, alternatively or additionally, they may be received, by the apparatus, via electromagnetic carrier signal and/or may be copied from a physical entity such as computer program product. Execution of the computer readable instructions causes the apparatus 600 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 600 further comprises, or is connected to, an input unit 630. The input unit 630 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 630 may comprise an interface to which external devices may connect to.

The apparatus 600 also comprises an output unit 640. The output unit comprises or is connected to one or more displays capable of rendering visual content such as a light emitting diode, LED, display, a liquid crystal display, LCD and a liquid crystal on silicon, LCoS, display. The output unit 640 further comprises one or more audio outputs. The one or more audio outputs may be for example loudspeakers or a set of headphones.

The apparatus 600 may further comprise a connectivity unit 650. The connectivity unit 650 enables wired and/or wireless connectivity to external networks. The connectivity unit 650 may comprise one or more antennas and one or more receivers that may be integrated to the apparatus 600 or the apparatus 600 may be connected to. The connectivity unit 650 may comprise an integrated circuit or a set of integrated circuits that provide the wireless communication capability for the apparatus 600. Alternatively, the wireless connectivity may be a hardwired application specific integrated circuit, ASIC.

It is to be noted that the apparatus 600 may further comprise various component not illustrated in the FIG. 6. The various components may be hardware component and/or software components.

The apparatus 700 of FIG. 7 illustrates an example embodiment of an apparatus that may be base station or be comprised in a base station, and that may embody the activator or the reader as described above. The apparatus may be, for example, a circuitry or a chipset applicable to an access node to realize the described embodiments. The apparatus 700 may be an electronic device comprising one or more electronic circuitries. The apparatus 700 may comprise a communication control circuitry 700 such as at least one processor, and at least one memory 720 including a computer program code (software) 722 wherein the at least one memory and the computer program code (software) 722 are configured, with the at least one processor, to cause the apparatus 700 to carry out any one of the example embodiments of the access node described above.

The memory 720 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 700 may further comprise a communication interface 730 comprising hardware and/or software for realizing communication connectivity according to one or more communication protocols. The communication interface 730 may provide the apparatus with radio communication capabilities to communicate in the cellular communication system. The communication interface may, for example, provide a radio interface to terminal devices. The apparatus 700 may further comprise another interface towards a core network such as the network coordinator apparatus and/or to the access nodes of the cellular communication system. The apparatus 700 may further comprise a scheduler 740 that is configured to allocate resources.

Even though the invention has been described above with reference to example embodiments according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising at least one processor, and at least one memory storing instructions that, when executed by the at least one processor, cause the apparatus to:

transmit, to an access node, a report indicating capability regarding detecting radio parameters, wherein the report comprises: a first set of radio parameters, a second set of radio parameters and a third set of radio parameters;

determine the first set of radio parameters in a complete manner;

determine the second set of radio parameters in the complete manner based on assistance information, a first configuration, and an indication related to the radio parameters being available;

determine the third set of radio parameters in the complete manner based on a second configuration related to detecting the radio parameters being available at least during an initial configuration for receiving a downlink channel transmission and based on the third set of radio parameters following behavior of the first and the second set of radio parameters;

receive, from the access node, for determining the second set of radio parameters: the assistance information, the first configuration and the indication for determining the second set of radio parameters for receiving the downlink channel transmission;

receive, from the access node, the downlink channel transmission;

trigger feedback for each scheduling instance; and transmit feedback to the access node to indicate that the first, second and third sets of radio parameters have been successfully determined, wherein the second configuration related to detecting the radio parameters is a full configuration for configuring determination of the first, the second and the third set of radio parameters, wherein the determining of the first, the second and the third set of radio parameters are based on a machine learning model, wherein determining in the complete manner comprises determining the radio parameters without any configuration of the radio parameters, wherein the determining the third set of radio parameters comprises learning unspecified modulation for a set of known coding rates, learning unspecified coding rates for a known modulation, and learning unspecified modulation and coding rates, wherein the assistance information comprises a modulation and coding scheme (MCS) table associated with a modulation and coding scheme (MCS) radio parameter of the second set of radio parameters, wherein the downlink channel transmission is received without receiving any explicit indication of a modulation and coding scheme (MCS) for a transport block of the downlink channel transmission, and wherein, in case the feedback is triggered by the apparatus, indicating a failure of detection of radio parameters only in a reception failures of data, control, or reference signal.

\* \* \* \* \*